United States Patent
Veillard et al.

(10) Patent No.: US 8,974,056 B2
(45) Date of Patent: Mar. 10, 2015

(54) METHOD FOR MAKING A HYBRID CONTACT LENS

(75) Inventors: Emmanuel Veillard, Caen (FR); Pascal Renault, Caen (FR); Jean-Philippe Lebailly, Caen (FR)

(73) Assignee: Lentilles, Caen (FR)

( * ) Notice: Subject to any disclaimer, the term of this patent is extended or adjusted under 35 U.S.C. 154(b) by 0 days.

(21) Appl. No.: 13/577,710

(22) PCT Filed: Feb. 18, 2011

(86) PCT No.: PCT/EP2011/052414
§ 371 (c)(1),
(2), (4) Date: Aug. 8, 2012

(87) PCT Pub. No.: WO2011/104181
PCT Pub. Date: Sep. 1, 2011

(65) Prior Publication Data
US 2012/0307201 A1    Dec. 6, 2012

(30) Foreign Application Priority Data
Feb. 25, 2010   (FR) ...................................... 10 51338

(51) Int. Cl.
*G02C 7/04*     (2006.01)
*B29D 11/00*    (2006.01)

(52) U.S. Cl.
CPC .......... B29D 11/00048 (2013.01); G02C 7/049 (2013.01)
USPC ............. 351/159.33; 351/159.73; 351/159.24

(58) Field of Classification Search
USPC .............. 351/159.03–159.23, 159.25–159.38
See application file for complete search history.

(56) References Cited

U.S. PATENT DOCUMENTS

| | | | | |
|---|---|---|---|---|
| 4,558,931 A * | 12/1985 | Fuhrman | ................... | 351/159.21 |
| 4,573,774 A * | 3/1986 | Sitterle | ................... | 351/159.21 |
| 4,573,775 A * | 3/1986 | Bayshore | ................. | 351/159.42 |
| 6,579,918 B1 * | 6/2003 | Auten et al. | .................. | 523/106 |
| 2005/0018130 A1 * | 1/2005 | Dahi et al. | ................. | 351/160 R |
| 2005/0272833 A1 * | 12/2005 | Doshi | ........................... | 523/160 |
| 2006/0256283 A1 * | 11/2006 | Legerton et al. | .......... | 351/160 R |
| 2006/0285072 A1 * | 12/2006 | Dahi et al. | ................. | 351/160 R |
| 2007/0013869 A1 * | 1/2007 | Dahi et al. | ..................... | 351/219 |
| 2008/0291391 A1 * | 11/2008 | Meyers et al. | ............ | 351/160 H |
| 2010/0036488 A1 * | 2/2010 | de Juan et al. | ............... | 623/5.16 |

FOREIGN PATENT DOCUMENTS

| | | |
|---|---|---|
| GB | 1417650 A | 12/1975 |
| WO | 9406621 A1 | 3/1994 |
| WO | 2005079290 A2 | 9/2005 |

OTHER PUBLICATIONS

International Search Report dated May 12, 2011 of PCT/EP2011/052414.

* cited by examiner

*Primary Examiner* — Suchin Parihar
*Assistant Examiner* — William Alexander
(74) *Attorney, Agent, or Firm* — Banner & Witcoff, Ltd.

(57) ABSTRACT

The invention relates to a method for making a hybrid contact lens, comprising: a step of providing a hydrophilic disc (100); a step of providing a rigid disc (200); a step of hydrating the hydrophilic disc (100); a step of applying an adhesive element (202) on a surface of the rigid disc; a step of bonding the hydrophilic disc (100) to said surface of the rigid disc; a step of drying the two thus bonded discs (100); and a step of cutting the two thus bonded and dried discs (100).

10 Claims, 1 Drawing Sheet

METHOD FOR MAKING A HYBRID CONTACT LENS

The present invention concerns a hybrid contact lens fabrication method and a hybrid contact lens obtained by means of such a fabrication method.

In the field of contact lenses, there exist two large families: rigid lenses and hydrophilic lenses.

Rigid lenses are permeable to oxygen and enable compensation of irregular visual defects appearing for example after a trauma or a pathology, but are uncomfortable.

Hydrophilic lenses offer great comfort thanks to their flexibility and their large diameter but are incapable of compensating irregular visual defects such as irregular astigmatism, for example.

A new family of contact lenses has appeared that enable compensation of irregular visual defects at the same time as producing a sensation of great comfort. This new family is constituted of hybrid contact lenses that are constituted of a core of the rigid lens type and a peripheral skirt of the hydrophilic lens type.

Different methods of fabricating the hybrid lenses have been developed, but none is entirely satisfactory, in particular on the plane of ease of use.

An object of the present invention is to propose a hybrid contact lens fabrication method that does not have the drawbacks of the prior art and that in particular enables easy use.

To this end there is proposed a method of fabricating a hybrid contact lens, including:
- a step of procuring a hydrophilic blank,
- a step of procuring a rigid blank,
- a step of hydration of the hydrophilic blank,
- a step of depositing an adhesive element onto one face of the rigid blank,
- a step of bonding the hydrated hydrophilic blank against said face of the rigid blank,
- a step of drying of the two blanks bonded in this way, and
- a step of trimming the two blanks bonded and dried in this way.

The trimming step is advantageously effected when the hydrophilic blank is completely dehydrated.

The fabrication method advantageously includes, before the hydration step, a step of pre-machining of the hydrophilic blank.

The adhesive element catalyst advantageously water or ultraviolet light.

The step of procuring a rigid blank advantageously consists in procuring a rigid blank having a convex shape.

The invention also proposes a hybrid contact lens comprising a rigid core and a hydrophilic peripheral skirt obtained by the use of a fabrication method conforming to any one of the preceding variants.

Figure 3:
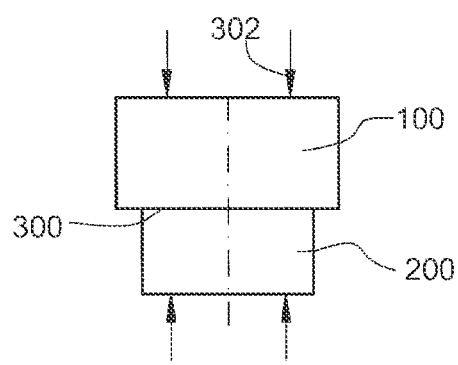
Figure 6:
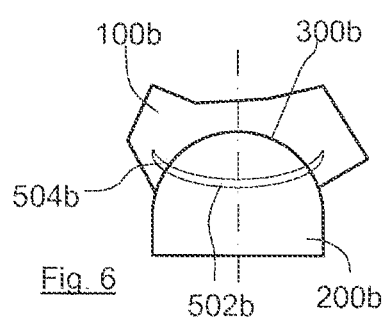
Figure 4:
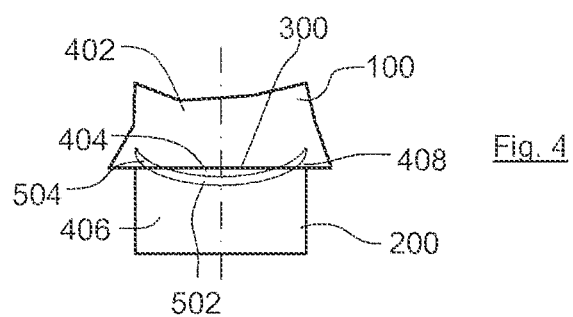
Figure 7:
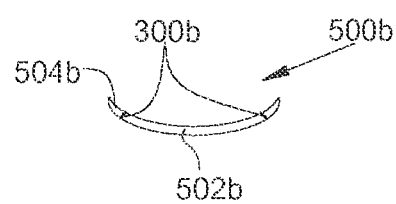
Figure 5:
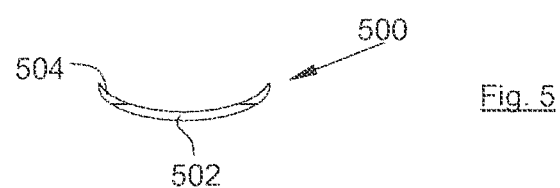

The features of the invention mentioned above, and others, will become more clearly apparent on reading the following description of one embodiment, said description being given with reference to the appended drawings, in which:

FIGS. 1 to 4 show the various steps of the fabrication method of one embodiment of the invention, FIG. 5 shows a hybrid contact lens of one embodiment of the invention, FIG. 6 shows a step of drying two blanks of another embodiment of the invention, and FIG. 7 shows a hybrid contact lens another embodiment of the invention.

FIG. 5 shows a hybrid contact lens 500 obtained by use of a fabrication method of the invention. The hybrid contact lens 500 includes a core 502 of the rigid lens type and a peripheral skirt 504 of the hydrophilic lens type.

The fabrication method, the various steps of which are shown in FIGS. 1 to 4, is applied to a flexible hydrophilic blank and a gas-permeable rigid blank. Such blanks are also known as "buttons".

Each blank conventionally takes the form of a solid cylinder the axis of which is represented in thin chain-dotted line.

The hydrophilic blank is for example a blank made of hydroxyethylmethacrylate (HEMA) or any other appropriate material. The material used is of the type used to produce silicone-hydrogel lenses and flexible hydrophilic lenses.

The rigid blank is for example a blank made from polymethylmethacrylate (PMMA) or any other appropriate material. The material used is of the type used to produce gas-permeable rigid lenses of all types of Dk from 0 to 200.

Figure 1:
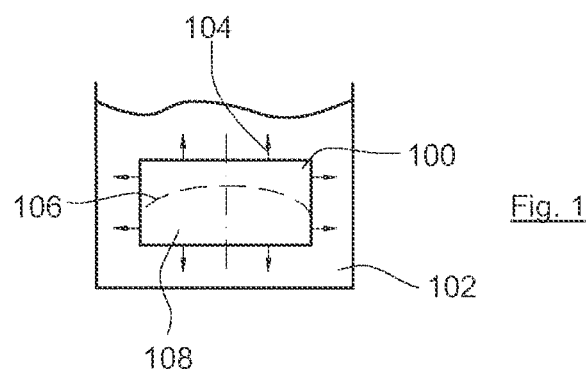

FIG. 1 shows a step of hydration of the hydrophilic blank 100. The hydrophilic blank 100 is immersed in an aqueous solution 102 which is of the physiological serum type, for example.

Immersion of the hydrophilic blank 100 in the aqueous solution 102 leads to expansion of said hydrophilic blank 100 (arrows 104).

The step of hydration of the hydrophilic blank 100 is advantageously effected until complete hydration of the hydrophilic blank 100 is obtained.

In other embodiments of the invention, hydration before bonding may be partial and the rate of hydration depend on the material constituting the hydrophilic blank 100. For example, for the material GM Advance 49%, the water content of which is 49%, the rate of hydration before bonding is preferably from 55% to 60% and more particularly 55.4%. In other words, at the moment of bonding, the hydrated hydrophilic blank 100 is composed of 27% aqueous solution and 73% hydrophilic polymer.

The duration of the hydration step varies from one day to several days as a function of the water content of the material used and the required rate of hydration before bonding.

Figure 2:
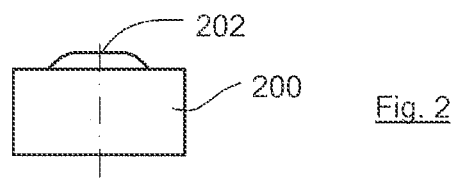

FIG. 2 shows a step of deposition of an adhesive element 202 onto an external face of the rigid blank 200, here the plane upper face.

The adhesive element 202 may be glue or a polymer or any product compatible with use on the eyes and that enables satisfactory bonding of the two blanks 100 and 200.

The glue 202 may be cyanoacrylate, for example, a derivative of cyanoacrylate such as ethyl-cyanoacrylate, for example, or any other appropriate glue or any other polymer enabling assembly of the two polymers.

FIG. 3 shows a step of bonding the hydrated (and thus expanded) hydrophilic blank 100 onto the face of the rigid blank 200 that carries the adhesive element 202.

The two blanks 100 and 200 are held in contact for the time necessary for perfect bonding of the two blanks 100 and 200. The duration of this bonding step varies from 1 to 10 seconds as a function of the materials used for the blanks 100 and 200 and for the adhesive element 202.

The arrows 302 represent the forces that hold the blanks 100 and 200 in contact to bond them, which are created by any appropriate device.

The external faces of the two blanks 100 and 200 are then bonded together at the level of a joining plane 300.

In the embodiment of the invention described here bonding is effected by polymerization.

FIG. 4 shows a step of drying the two blanks 100 and 200 bonded in this way.

The hydrophilic blank 100 is dehydrated and its volume is therefore reduced.

The duration of this bonding step varies from one day to several days as a function of the materials used for the blanks 100 and 200 and for the adhesive element 202.

The drying step may be facilitated by the use of an oven and/or desiccation salts.

When the drying of the adhesive element is finished, the blanks 100 and 200 bonded and dried in this way are subjected to a trimming step that consists in producing the hybrid contact lens 500.

The trimming step is advantageously effected when the hydrophilic blank 100 is completely dehydrated.

The cutting step consists for example in first machining the rear face of the hybrid contact lens 500 and then machining the front face, in accordance with known rules of the art of contact lens fabrication.

The hybrid contact lens 500 is thus produced on either side of the joining plane 300.

For the area to the rear of the core 502, the machining of the rear face of the hybrid contact lens 500 is effected by removal of the material 402 of the hydrophilic blank 100 as far as the joining plane 300, followed by removal of the material 404 of the rigid blank 200 from the joining plane 300 as far as the rear face of the core 502 of the hybrid contact lens 500.

For the area to the rear of the peripheral skirt 504, the machining of the rear face of the hybrid contact lens 500 is effected by removal of the material 402 of the hydrophilic blank 100 as far as the rear face of the peripheral skirt 504 of the hybrid contact lens 500.

For the area in front of the core 502, the machining of the front face of the hybrid contact lens 500 is effected by removal of the material 406 of the rigid blank 200 as far as the front face of the core 502 of the hybrid contact lens 500.

For the area in front of the peripheral skirt 504, the machining of the front face of the hybrid contact lens 500 is effected by removal of the material 406 of the rigid blank 200 as far as the joining plane 300, and then by removal of the material 408 of the hydrophilic blank 100 from the joining plane 300 as far as the front face of the peripheral skirt 504 of the hybrid contact lens 500.

This cutting step is effected by means of conventional tools, such as a digital lathe for example.

The method of fabricating the hybrid contact lens 500 thus includes:
- a step of procuring the hydrophilic blank 100,
- a step of procuring the rigid blank 200,
- a step of hydration of the hydrophilic blank 100,
- a step of depositing an adhesive element 202 onto one face of the rigid blank 200,
- a step of bonding the hydrated hydrophilic blank 100 against said face of the rigid blank 200,
- a step of drying of the two blanks 100, 200 bonded in this way, and
- a step of trimming the two blanks 100, 200 bonded and dried in this way.

The method of fabricating the hybrid contact lens 500 is thus particularly simple to use.

The preliminary hydration and the expansion of the hydrophilic blank 100 and its expansion prevent the occurrence of creases after bonding and hydration of the hybrid contact lens 500 during its daily use. If the fabrication process does not use such a hydration step, the later hydration of the two blanks 100 and 200 bonded together leads to expansion of the peripheral skirt 504 and to the occurrence of creases and deformations at the level of the area of bonding between said peripheral skirt 504 and said core 502, and the lens could then not be supported on an eye.

To facilitate partial or complete hydration of the hydrophilic blank 100 and to reduce the time necessary for this complete hydration, the hydrophilic blank 100 is subjected to a pre-machining step prior to the hydration step which consists in removing a part 108 of the hydrophilic blank 100. The part 108 is not used in the hybrid contact lens 500.

The curve 106 shows the limit of the pre-machining.

To facilitate the bonding of the two blanks 100 and 200, it is of benefit to use an adhesive element 202 the catalyst whereof is water or ultraviolet light. The adhesive element 202 reacts in contact with water contained in the hydrophilic blank 100 when hydrated and is polymerized more easily and more quickly. Cyanoacrylate and its derivatives are particularly beneficial from this point of view.

Of course, the present invention is not limited to the examples and embodiments described and shown, but is susceptible to numerous variants that will be obvious to the person skilled in the art.

For example, the invention has been more particularly described in the context of cylindrical blanks with plane external faces but applies in the same manner to blanks with different shapes or with non-plane external faces or pre-cut and reduced size blanks.

FIG. 6 shows the step of drying between a hydrophilic blank 100b and a rigid blank 200b having a convex shape.

The hydrophilic blank 100b is thus bonded to the convex shape of the rigid blank 200b and the bonding surface 300b also has a convex shape.

FIG. 7 shows the hybrid contact lens 500b obtained by removal of the material from the rigid blank 200b bonded to the flexible blank 100b from FIG. 6.

The hybrid contact lens 500b then includes a rigid core 502b and a flexible peripheral skirt 504b.

Thus the bonding surface 300b follows the curvature of the rigid blank 200b.

In the embodiment of the invention shown in FIGS. 6 and 7, the bonding surface 300b is substantially perpendicular to the external surface of the hybrid contact lens 500b, which enables the visible part of the bonding area 300b to be reduced.

The durations of the steps mentioned above are given by way of example and may vary outside of the limits mentioned with other materials.

The invention claimed is:

1. A method of fabrication of a hybrid contact lens formed of a rigid core connected to a peripheral hydrophilic skirt by an element having characteristics of adhesion to said core and said skirt, characterized in that it includes the following steps
   procuring a rigid blank and a hydrophilic blank,
   hydrating said hydrophilic blank,
   depositing, on one face of the rigid blank, glue which is one of the characteristics of adhesion of the element,
   gluing the hydrated hydrophilic blank to said face of the rigid blank,
   drying the two blanks glued in this way, and
   then trimming the two blanks glued and dried in this way to obtain the contact lens with rigid core and hydrophilic peripheral skirt.

2. The method as claimed in claim 1, characterized in that the lens obtained is completely dehydrated before trimming it.

3. The method as claimed in claim 1, characterized in that before hydration of the hydrophilic blank the latter is pre-machined.

4. The method as claimed in claim 1, characterized in that the glue has water for its catalyst.

5. The method as claimed in claim 4, characterized in that the glue is chosen from derivatives of cyanoacrylate, including ethyl-cyanoacrylate.

6. The method as claimed in claim 1, characterized in that bonding is effected by application of one blank to the other and applying the forces necessary to assure gluing for a sufficient time.

7. The method as claimed in claim 6, characterized in that the time is from 1s to 10s.

8. The method as claimed in claim 1, characterized in that the rigid blank is trimmed beforehand so that its bonding surface has a convex shape.

9. The method as claimed in claim 8, characterized in that the bonding surface is such as to be substantially perpendicular to the external surface of the contact lens.

10. A hybrid contact lens formed of a rigid core connected to a hydrophilic peripheral skirt by an element having characteristics of adhesion to said core and said skirt, characterized in that the element is glue formed by a polymer having water for its catalyst and that the lens is obtained by the method as claimed in claim 1, wherein the polymer comprises cyanoacrylate or a derivative of cyanoacrylate.

* * * * *